(12) United States Patent
Essenmacher

(10) Patent No.: US 11,542,992 B2
(45) Date of Patent: Jan. 3, 2023

(54) COUPLING AND CONTROL ASSEMBLY INCLUDING A NON-CONTACT, LINEAR INDUCTIVE POSITION SENSOR

(71) Applicant: Means Industries, Inc., Saginaw, MI (US)

(72) Inventor: Ryan W. Essenmacher, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/171,027

(22) Filed: Feb. 9, 2021

(65) Prior Publication Data

US 2021/0301885 A1 Sep. 30, 2021

Related U.S. Application Data

(60) Provisional application No. 63/002,458, filed on Mar. 31, 2020.

(51) Int. Cl.
| | |
|---|---|
| *F16D 41/14* | (2006.01) |
| *F16D 23/12* | (2006.01) |
| *F16D 41/16* | (2006.01) |
| *F16D 41/12* | (2006.01) |
| *F16D 27/01* | (2006.01) |
| *F16D 27/102* | (2006.01) |
| *F16D 27/108* | (2006.01) |

(52) U.S. Cl.
CPC .............. *F16D 41/14* (2013.01); *F16D 27/01* (2013.01); *F16D 27/102* (2013.01); *F16D 27/108* (2013.01); *F16D 41/125* (2013.01); *F16D 41/16* (2013.01); *F16D 2023/123* (2013.01); *F16D 2300/18* (2013.01)

(58) Field of Classification Search
CPC ......................... F16D 41/12–16; F16D 41/30
See application file for complete search history.

(56) References Cited

U.S. PATENT DOCUMENTS

| | | |
|---|---|---|
| 4,050,560 A | 9/1977 | Torstenfelt |
| 4,340,133 A | 7/1982 | Blersch |
| | (Continued) | |

OTHER PUBLICATIONS

CTI Magazine; Automotive Drivetrains; Dec. 2018; pp. 1-68; Dusseldorf, Germany.

*Primary Examiner* — Ernesto A Suarez
*Assistant Examiner* — James J Taylor, II
(74) *Attorney, Agent, or Firm* — Reising Ethington P.C.

(57) ABSTRACT

A coupling and control assembly including a non-contact, linear inductive position sensor is provided. The assembly includes a coupling housing and a stator structure disposed within the coupling housing and including a stator housing. A translator structure is coupled to a coupling member of the assembly to rotate therewith about a rotational axis. The sensor is mounted on one of the housings. The translator structure includes a coupler element made of an electrically conductive material. The sensor is configured to create a magnetic field to induce eddy currents in the electrically conductive material. Movement of the coupler element changes a magnetic field caused by the eddy currents. The sensor provides a position feedback signal for vehicle transmission control. The signal is correlated with the linear position of the translator structure along the rotational axis.

12 Claims, 6 Drawing Sheets

(56) References Cited

U.S. PATENT DOCUMENTS

| | | |
|---|---|---|
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,342,258 A | 8/1994 | Egyed |
| 5,362,093 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,846,257 A | 12/1998 | Hood |
| 5,918,715 A | 7/1999 | Ruth et al. |
| 5,924,510 A | 7/1999 | Itoh et al. |
| 5,927,455 A | 7/1999 | Baker et al. |
| 6,065,576 A | 5/2000 | Shaw et al. |
| 6,075,302 A | 6/2000 | McCleer |
| 6,193,038 B1 | 2/2001 | Scott et al. |
| 6,244,965 B1 | 6/2001 | Klecker et al. |
| 6,290,044 B1 | 9/2001 | Burgman et al. |
| 6,328,670 B1 | 12/2001 | Minowa et al. |
| 6,503,167 B1 | 1/2003 | Sturm |
| 6,692,405 B2 | 2/2004 | Minowa |
| 6,814,201 B2 | 11/2004 | Thomas |
| 6,846,257 B2 | 1/2005 | Baker et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,223,198 B2 | 5/2007 | Kimes et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryan et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,690,455 B2 | 4/2010 | Kano et al. |
| 7,695,387 B2 | 4/2010 | Oba et al. |
| 7,806,795 B2 | 10/2010 | Oba et al. |
| 7,942,781 B2 | 5/2011 | Kimes |
| 8,286,722 B2 | 10/2012 | Leimbach et al. |
| 8,720,659 B2 | 5/2014 | Pawley |
| 8,813,929 B2 | 8/2014 | Kimes |
| 8,888,637 B2 | 11/2014 | Kimes |
| 9,109,636 B2 | 8/2015 | Kimes et al. |
| 9,121,454 B2 | 9/2015 | Pawley |
| 9,186,977 B2 | 11/2015 | Kimes |
| 9,188,170 B2 | 11/2015 | Prout et al. |
| 9,222,529 B2 * | 12/2015 | Richardson ........... F16D 41/125 |
| 9,255,614 B2 | 2/2016 | Kimes |
| 9,303,699 B2 | 4/2016 | Kimes et al. |
| 9,371,868 B2 | 6/2016 | Kimes et al. |
| 9,435,387 B2 | 9/2016 | Kimes et al. |
| 9,441,708 B2 | 9/2016 | Kimes et al. |
| 9,482,294 B2 | 11/2016 | Kimes |
| 9,482,297 B2 | 11/2016 | Brubaker et al. |
| 9,541,141 B2 | 1/2017 | Kimes et al. |
| 9,562,574 B2 | 2/2017 | Kimes |
| 9,638,266 B2 | 5/2017 | Kimes |
| 9,732,809 B2 | 8/2017 | Niemiec et al. |
| 9,874,252 B2 | 1/2018 | Kimes et al. |
| 9,915,298 B2 * | 3/2018 | Heravi ................. F16D 27/118 |
| 2003/0102196 A1 | 6/2003 | Wetzel et al. |
| 2004/0110594 A1 | 6/2004 | Goto |
| 2006/0138777 A1 | 6/2006 | Hofbauer et al. |
| 2006/0185957 A1 | 8/2006 | Sedlacek et al. |
| 2006/0252589 A1 | 11/2006 | Tay |
| 2006/0278487 A1 | 12/2006 | Pawley et al. |
| 2007/0056825 A1 | 3/2007 | Fetting et al. |
| 2007/0278061 A1 | 12/2007 | Wittkopp et al. |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0140451 A1 | 6/2011 | Sharples et al. |
| 2011/0177900 A1 | 7/2011 | Simon |
| 2011/0215575 A1 | 9/2011 | Hofbauer et al. |
| 2011/0233026 A1 | 9/2011 | Pawley |
| 2012/0149518 A1 | 6/2012 | Kimes |
| 2013/0256078 A1 | 10/2013 | Kimes et al. |
| 2013/0277164 A1 | 10/2013 | Prout et al. |
| 2014/0100071 A1 | 4/2014 | Kimes |
| 2015/0000442 A1 | 1/2015 | Kimes et al. |
| 2015/0001023 A1 | 1/2015 | Kimes |
| 2015/0014116 A1 | 1/2015 | Kimes et al. |
| 2016/0047439 A1 | 2/2016 | Kimes et al. |
| 2016/0131205 A1 | 5/2016 | Essenmacher |
| 2016/0131206 A1 | 5/2016 | Essenmacher |
| 2016/0369855 A1 | 12/2016 | Essenmacher |
| 2016/0377126 A1 | 12/2016 | Essenmacher |
| 2018/0010651 A1 | 1/2018 | Kimes |
| 2018/0038425 A1 | 2/2018 | Kimes |
| 2018/0106304 A1 | 4/2018 | Kimes et al. |
| 2018/0156332 A1 | 6/2018 | Kimes et al. |
| 2018/0231105 A1 | 8/2018 | Kimes et al. |
| 2018/0328419 A1 | 11/2018 | Hand et al. |
| 2018/0347642 A1 * | 12/2018 | Kimes ................. F16D 27/108 |
| 2019/0063513 A1 * | 2/2019 | Peglowski ......... B60K 23/0808 |
| 2019/0170198 A1 | 6/2019 | Kimes |
| 2020/0094676 A1 * | 3/2020 | Creech ................. B60K 23/04 |
| 2020/0378453 A1 * | 12/2020 | Barnes ................ F16D 29/00 |

* cited by examiner

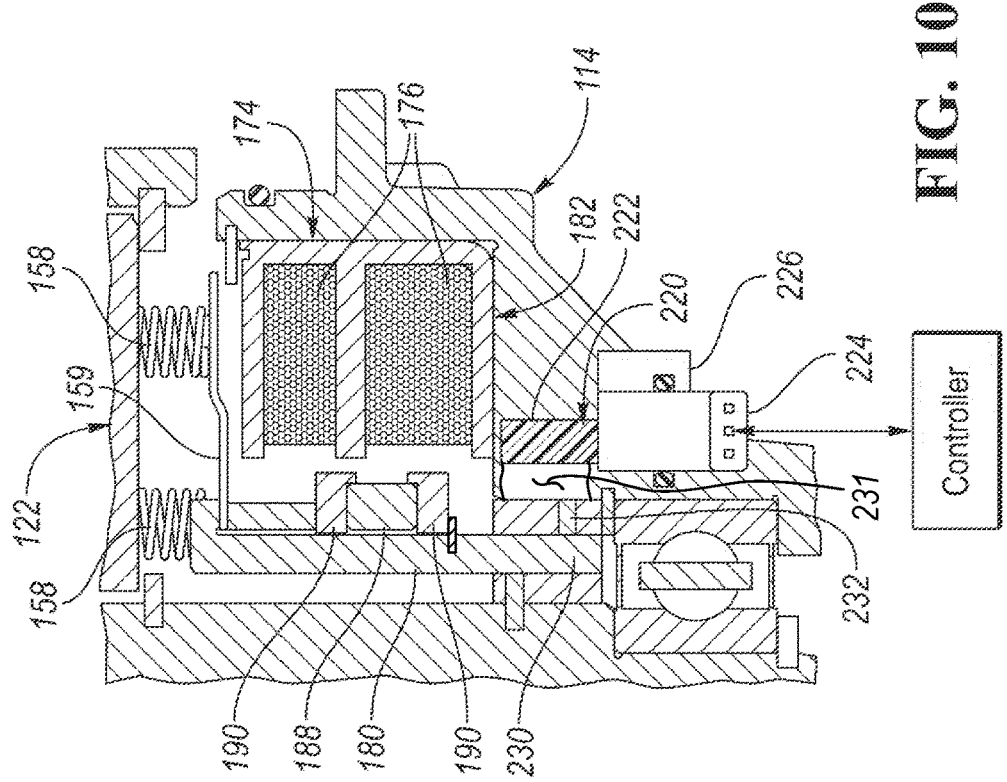
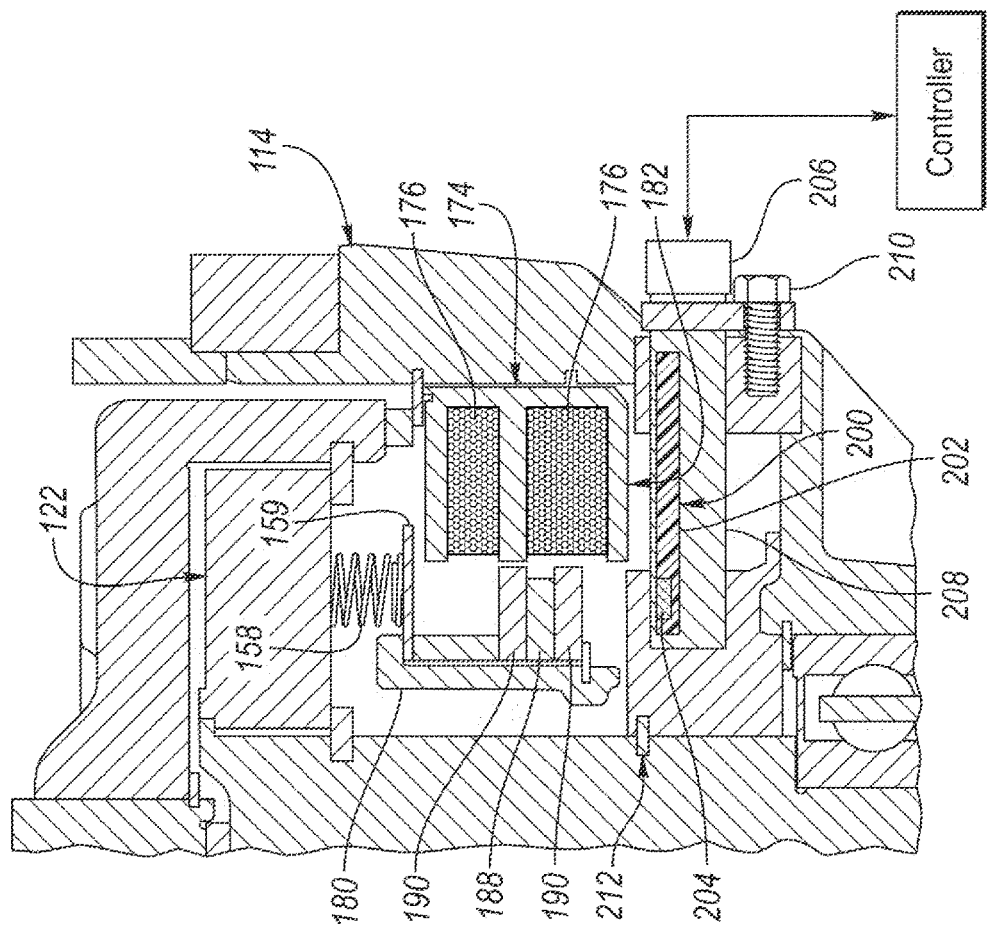

COUPLING AND CONTROL ASSEMBLY INCLUDING A NON-CONTACT, LINEAR INDUCTIVE POSITION SENSOR

CROSS-REFERENCE TO RELATED APPLICATIONS

This application claims the benefit of U.S. provisional application Ser. No. 63/002,458 filed Mar. 31, 2020, the disclosure of which is hereby incorporated in its entirety by reference herein.

TECHNICAL FIELD

This invention generally relates to coupling and control assemblies, each of which has a non-contact linear inductive position sensor and, in particular, to such assemblies which use linear inductive position sensors to sense translator position.

OVERVIEW

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2016/0377126; 2015/0014116; 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 20009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0252589; 2006/0278487; 2006/0138777; 2006/0185957; 2004/0110594; and the following U.S. Pat. Nos. 9,874,252; 9,732,809; 8,888,637; 7,942,781; 7,806,795; 7,695,387; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,328,670; 6,692,405; 6,193,038; 4,050,560; 4,340,133; 5,597,057; 5,918,715; 5,638,929; 5,342,258; 5,362,293; 5,678,668; 5,070,978; 5,052,534; 5,387,854; 5,231,265; 5,394,321; 5,206,573; 5,453,598; 5,642,009; 6,075,302; 6,065,576; 6,982,502; 7,153,228; 5,846,257; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high-speed moves with low mass payloads. Mechanical simplicity and precise open loop operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

U.S. patent documents assigned to the same assignee as the present application and which are related to the present application include U.S. Pat. Nos. 8,813,929; 8,888,637; 9,109,636; 9,121,454, 9,186,977; 9,303,699; 9,435,387; 2012/0149518; 2013/0256078; 2013/0277164; 2014/0100071; 2015/0014116; 9,255,614; 2015/0001023; 9,371,868; 2016/0369855; 2016/0131206; 2016/0377126; 2016/0131205; 2016/0047439; 2018/0328419; 2018/0010651; 2018/0038425; 2018/0106304; 2018/0156332; 2018/0231105; 2019/0170198; 9,482,294; 9,482,297; 9,541,141; 9,562,574; 9,638,266; 8,286,722; 8,720,659; and 9,188,170.

The disclosures of all of the above-noted, commonly assigned patent documents are hereby incorporated in their entirety by reference herein.

Some of the above related patent documents assigned to the assignee of the present application disclose a 2-position, linear, eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442; 2016/0047439; and U.S. Pat. No. 9,441,708 disclose 3-position, linear motor, magnetically-latching, 2-way CMDs.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (the more stretched rubber bands) in any one direction across an air gap separating machine elements, the more "pulling" force between machine elements in that given direction.

Electro-Dynamic Clutches

Transmissions of all kinds need dynamic clutches, or clutches which have two rotatable races. Wet friction clutch packs, dog clutches, and synchronizers are commonly used in dynamic clutch assemblies.

A prior art Dynamic Controllable Clutch (DCC) is generally indicated at 12 in FIGS. 1-3. The DCC 12 is electrically-actuated. The DCC 12 has a race or pocket plate 13 and a race or notch plate 16. The pocket plate 13 contains two sets of radial locking elements 26—one set for CW and the other set for CCW engagement. During engagement, at least one set of locking elements 26 simultaneously contact pocket and notch engagement faces of the pocket and notch plates 13 and 16, respectively, which allows the clutch 12 to transmit torque.

Unlike static CMD-e clutches, the dynamic functionality of DCCs does not allow for solenoids to be used to engage and disengage the locking elements 26. A linear motor, generally indicated at 14, controls the locking elements 26 while both races 13 and 16 are rotating. The linear motor 14 comprises a stator, generally indicated at 22, and a translator, generally indicated at 20. The stator 22 is stationary and is fixed to the transmission case (not shown) via mounts 47. The stator 22 consists of copper wire coils 44 and 46 and steel plates 48, 50 and 52. The plates 48, 50 and 52 provide or define a housing for the coils. The two coils 44 and 46 are wound in series with reversed polarity relative to one another (anti-series).

In the DCC 12 of FIGS. 1-3, the translator 20 is assembled to and rotates with the pocket plate 13. The translator 20 consists of an annular ring of segmented permanent magnets 21, steel plates 23 and 25, and rigid plungers 30 that operate the locking elements 26. The plungers 30 extend through holes formed through a carriage 51 of the translator 20 and are biased by springs 34. The plungers 30 are threaded at their ends and secured within their holes by internally threaded nuts 35. The conical ends of each plunger 30 extend through apertures of a ring 53.

FIGS. 2 and 3 detail how the linear motor 14 controls the DCC's locking elements 26. The plungers 30 within the translator 20 directly contact the locking elements 26 and cause them to pitch up or pitch down depending on actuation direction. When the translator 20 moves from "off" to "on" each plunger 30 contacts the under face or surface of its locking element 26 so it can engage into the notch plate 16. The clutch 12 is able to transmit torque after the locking elements 16 are engaged. A return spring 28 under each locking element 26 is compressed during the engaged state. When commanded "off", the translator 20 moves back toward the "off" (i.e. right most) position and the plungers 30 lose contact with the locking elements 26. The compressed return springs 28 create a force that causes the locking elements 26 to pitch downward or disengage. Once a torque reversal occurs, the locking elements 26 can disengage and the clutch 12 can freewheel.

FIGS. 2 and 3 show the linear motor 14 in the "off" and "on" positions, respectively. To change state from "off" to "on", electrical current energizes the coil 46 nearest to the translator 20. The energized coil 46 produces a magnetic field which repels the steady state field generated by the permanent magnets 21 while the far coil 44 produces an attractive magnetic field.

The combination of repelling and attracting forces caused by the stator coils 44 and 46 causes the translator 20 to move. Once the translator 20 passes over the center stator steel plate 50, the permanent magnet 21 attempts to fully align the leftmost steel plate 48 of the stator 22. However, a mechanical stop 53 (FIGS. 2 and 3) prevents full alignment, which results in a biasing force that holds the translator 20 in the "on" position. The translator 20 is magnetically latched in the "on" position.

Similar to a bi-stable solenoid, magnetic latching allows the electric power to be removed whenever the device is not actively changing position. After 50 to 150 ms, the electrical current is turned "off" as change of state is achieved and is no longer needed. The magnetic latching force eliminates energy consumption during steady state conditions.

To disengage the DCC 12, current is applied to the coil 44 nearest to the translator 20 (formerly the far coil 46) and the linear motor 14 moves from the "on" stop 53 to a ring which functions as an "off" stop 42 in a similar manner described above. The "off" mechanical stop 42 prevents full alignment of the permanent magnet 21 and the rightmost steel plate 52 of the stator 22, remaining magnetically latched in the "off" position.

The DCCs can replace synchronizers within simple gearboxes such as AMTS and DCTs and improves overall packaging by eliminating complex shift fork-based actuation systems. Shift fork actuation systems are eliminated and the linear motor actuation system described above packages completely inside the transmission case.

A problem with DCCs as described above is that such actuation systems are relatively complicated and have a relatively large number of component parts.

A problem with DCCs having a hydraulic actuation system is that the DCC operates in a hot oil environment wherein the oil may become contaminated. Also, hydraulic actuation systems typically have a poor reaction time and limited acceleration and require a relatively large amount of energy to operate over the life of the actuation system. Furthermore, many such systems only move in one direction and require one or more springs to provide a return stroke.

Latches are often used with one-way clutches to hold the clutch in either an "on" position or an "off" position using hydraulics, pneumatics, mechanics or electrical energy. Such latches are typically contained within the actuation system of the clutch. This presents a problem for dynamically controlled clutches because such action systems typically do not like to be rotated and, consequently, tend to be external to the clutch.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic (TMR) element, an Indium antimonide (InSb) sensor, and a magnet tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive.

U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-magnet gap tolerances, a ratio of the voltage of one Hall sensor to the sum of the voltages from both Hall sensors is used to correlate to the piston and, hence, clutch position. The following U.S. and foreign patent documents are related to the present invention: GB 253319; DE 102016118266; FR 3025878; and U.S. Pat. No. 10,247,578.

For purposes of this application, the term "coupling" should be interpreted to include clutches or brakes wherein one of the plates is driveably connected to a torque delivery element of a transmission and the other plate is driveably connected to another torque delivery element or is anchored and held stationary with respect to a transmission housing. The terms "coupling," "clutch" and "brake" may be used interchangeably.

Despite the above, there is still a need to sense translator position within a coupling and control assembly to detect both "fully connected" and "fully disconnected" coupling states especially during stator coil firing.

SUMMARY OF EXAMPLE EMBODIMENTS

An object of at least one embodiment of the present invention is to provide a coupling and control assembly including at least one non-contact, linear inductive displacement sensor which senses translator position wherein there is no need to indirectly infer a coupling state of the assembly.

In carrying out the above object and other objects of at least one embodiment of the present invention, a coupling and control assembly including a non-contact, linear inductive position sensor is provided. The assembly includes a coupling housing and a stator structure disposed within the coupling housing and including a stator housing defining a rotational axis. At least one electromagnetic source is disposed within the stator housing. The assembly includes first and second coupling members each of which is supported for rotation about the rotational axis within the coupling housing and a locking member for selectively mechanically coupling the coupling members together. A translator structure is coupled to the second coupling member to rotate therewith. The translator structure includes a plunger having a free end portion configured to move within a passage in the second coupling member to engage and actuate the locking member disposed within the second coupling member. The translator structure is supported for small-displacement, translational movement relative to the stator housing along the rotational axis between first and second stable axial end positions which correspond to first and second operating states of the assembly, respectively. The translator structure translates along the rotational axis between the different end positions upon experiencing a net translational force. The net translational force comprises a first translational force caused by energization of the at least one electromagnetic source and a magnetic latching force based upon linear position of the translator structure along the rotational axis relative to the stator housing. A non-contact, linear inductive position sensor is mounted on one of the housings. The translator structure includes a coupler element made of an electrically conductive material. The sensor is configured to create a magnetic field to induce eddy currents in the electrically conductive material of the coupler element wherein movement of the coupler element changes a magnetic field caused by the eddy currents. The sensor provides a position feedback signal for vehicle transmission control. The signal is correlated with the linear position of the translator structure along the rotational axis.

The at least one electromagnetic source may include at least one electromagnetically inductive coil.

One of the structures may include a permanent magnet source.

The locking member may be a strut or a rocker.

The first coupling member may be a notch plate and the second coupling member may be a pocket plate.

The translator structure may have a pair of stable, unpowered, magnetically latching states which correspond to coupling and uncoupling positions of the locking member.

The sensor may include a printed circuit board wherein the coupler element is supported proximate the board.

The coupler element may comprise an annular conductive ring.

The sensor may be mounted on an exterior surface of the stator housing.

The sensor may be mounted on an interior surface of the coupling housing.

Still further in carrying out the above object and other objects of at least one embodiment of the present invention, a clutch and control assembly including a non-contact, linear inductive position sensor is provided. The assembly includes a clutch housing and a stator structure disposed within the clutch housing and including a stator housing defining a rotational axis. At least one electromagnetic source is disposed within the stator housing. The assembly includes first and second clutch members each of which is supported for rotation about the rotational axis within the clutch housing and a plurality of locking members for selectively mechanically coupling the clutch members together. A translator structure is coupled to the second clutch member to rotate therewith. The translator structure includes a plurality of plungers. Each of the plungers has a free end portion configured to move within a passage in the second clutch member to engage and actuate a locking member disposed within the second clutch member. The translator structure is supported for small-displacement, translational movement relative to the stator housing along the rotational axis between first and second stable axial end positions which correspond to first and second operating states of the assembly, respectively. The translator structure translates along the rotational axis between the different end positions upon experiencing a net translational force. The net translational force comprises a first translational force caused by energization of the at least one electromagnetic source and a magnetic latching force based upon linear position of the translator structure along the rotational axis relative to the stator housing. A non-contact, linear inductive position sensor is mounted on one of the housings. The translator structure includes a coupler element made of an electrically conductive material. The sensor is configured to create a magnetic field to induce eddy currents in the electrically conductive material of the coupler element wherein movement of the coupler element changes a magnetic field caused by the eddy currents. The sensor provides a position feedback signal for vehicle transmission control wherein the signal is correlated with the linear position of the translator structure along the rotational axis.

The at least one electromagnetic source may include at least one electromagnetically inductive coil.

One of the structures may include a permanent magnet source.

Each of the locking members may be a strut or a rocker.

The first clutch member may be a notch plate and the second clutch member may be a pocket plate.

The translator structure may have a pair of stable, unpowered, magnetically latching states which correspond to coupling and uncoupling positions of the locking members.

The sensor may include a printed circuit board wherein the coupler element is supported proximate the board.

The coupler element may comprise an annular conductive ring.

The sensor may be mounted on an exterior surface of the stator housing.

The sensor may be mounted on an interior surface of the clutch housing.

BRIEF DESCRIPTION OF THE DRAWINGS

FIG. 9 is a view similar to the view of FIG. 7, wherein the assembly of FIG. 6 has been modified to include a non-contact, linear, inductive position sensor; and FIG. 10 is a view similar to the view of FIG. 8, wherein the assembly of FIG. 6 has been modified differently from the embodiment of FIG. 9 to include a non-contact linear inductive position sensor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
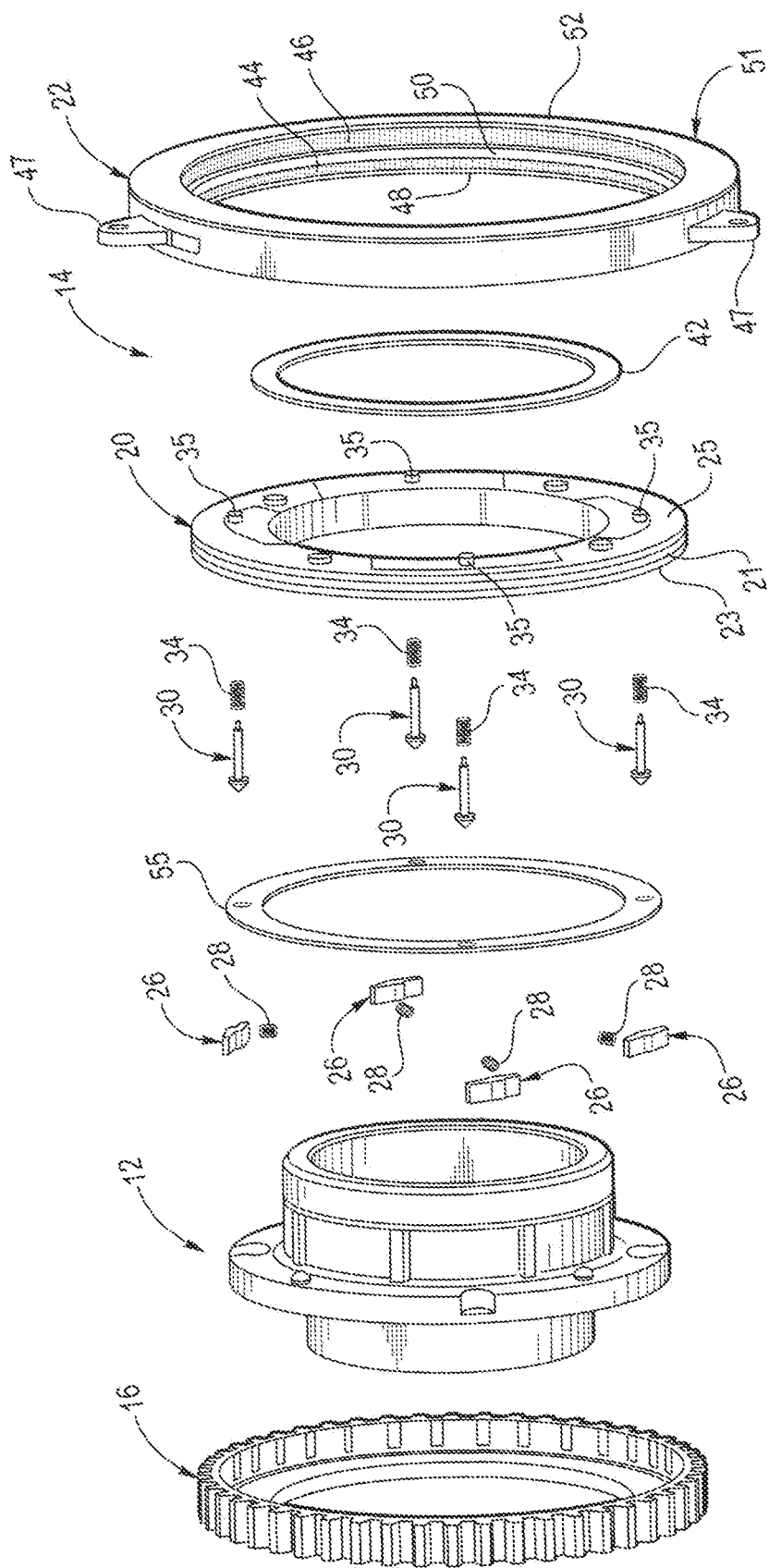
FIG. 1 is an exploded, perspective view of a prior art electro-dynamic coupling and control assembly including a dynamic controllable clutch (DCC) which is modified in accordance with at least one embodiment of the present invention.
Figure 2:
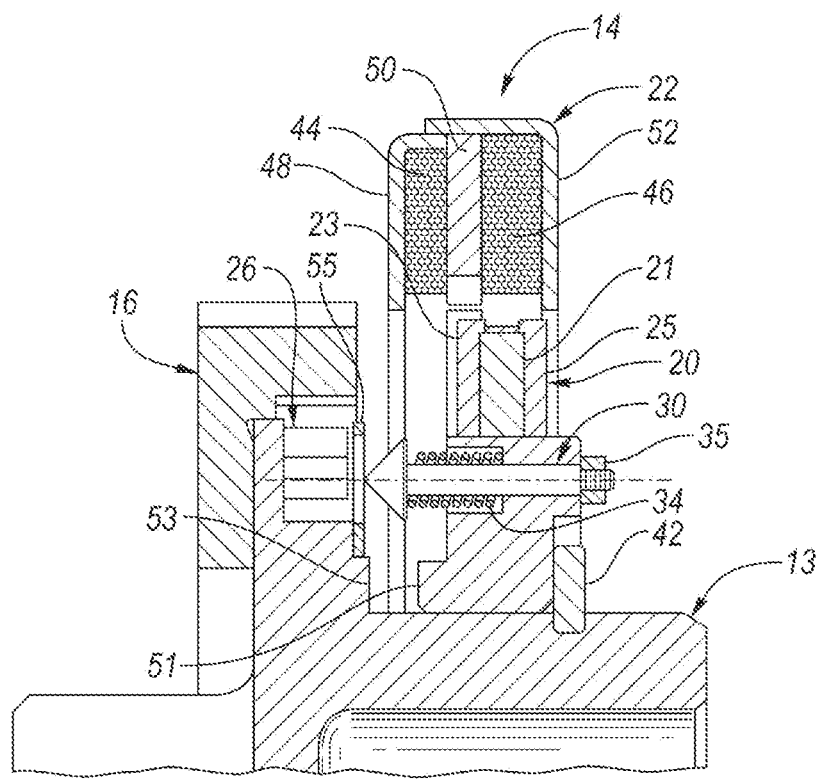
FIG. 2 is a side view, partially broken away, and in cross section of the clutch of FIG. 1 with the translator of its linear motor magnetically latched in its "off" position.
Figure 3:
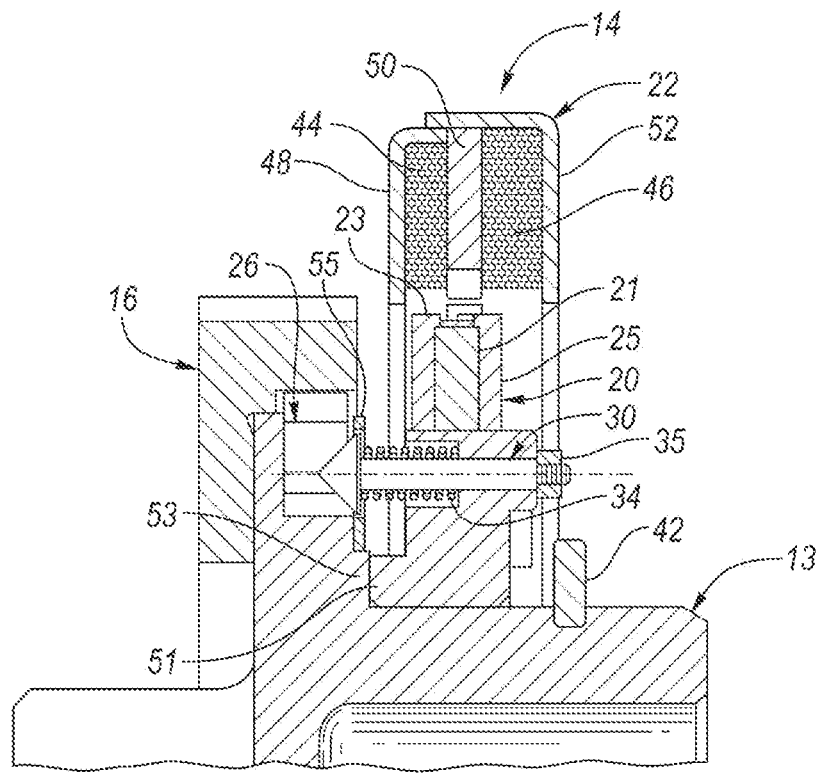
FIG. 3 is a view, similar to the view of FIG. 2, with the translator magnetically latched in its "on" position.
Figure 4:
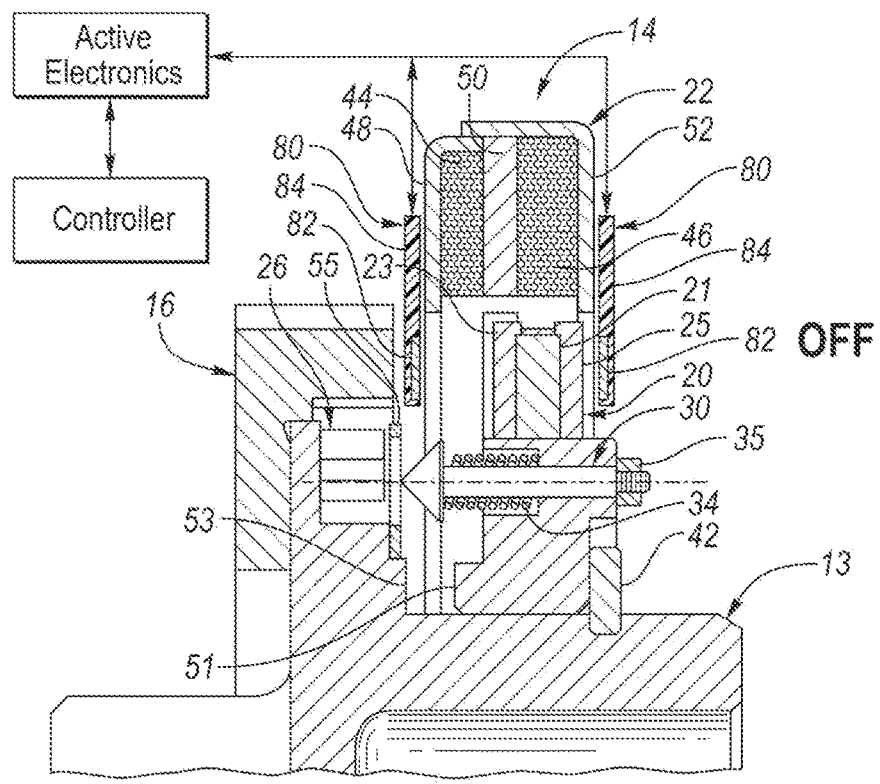
FIG. 4 is a view, similar to the view of FIG. 2, wherein the assembly of FIG. 1 has been modified to include a non-contact linear, inductive position sensor.
Figure 5:
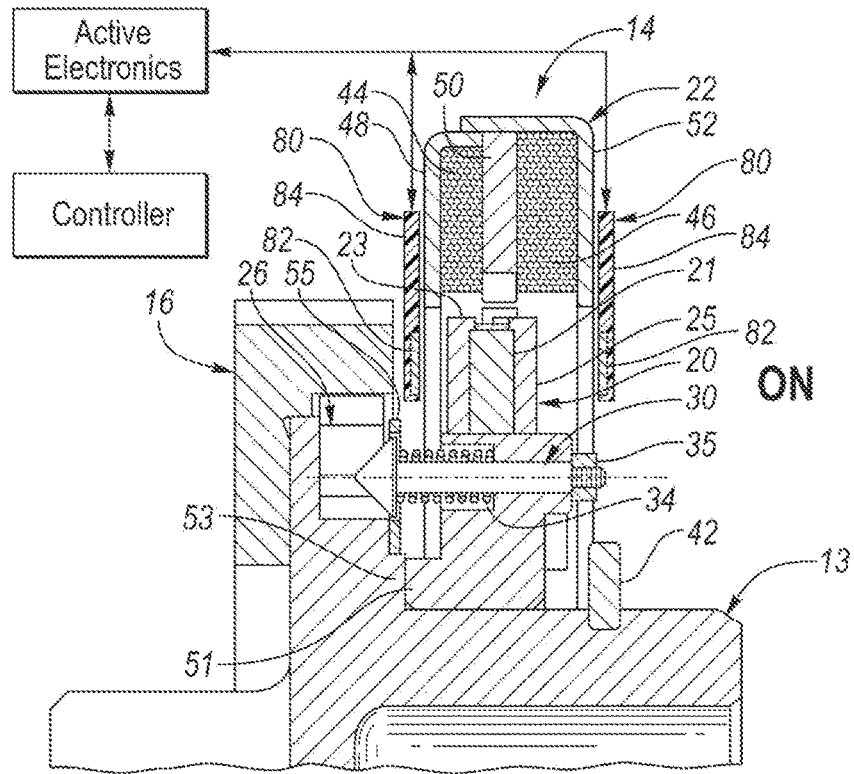
FIG. 5 is a view similar to the view of FIG. 4, but with translator latched in its "on" position.

Referring now to FIGS. 4 and 5, the assembly or DCC 12 of the prior art of FIGS. 1-3 has been modified to include a non-contact, linear inductive position sensor, generally indicated at 80. FIGS. 4 and 5 show alternative locations of the sensor 80 on plates 48 and 52 of the stator housing.

The position or eddy current sensor 80 works by creating, changing magnetic fields in a coil in a coil active area 82 of a PCB 84 to induce loops of eddy currents in electrically conductive material of a side steel or steel plate 23 or 25. The resultant circular flow of electric current in the conductive material creates an electromagnet, which opposes the magnetic field of the coil. The sensor 80 can measure the change in the magnetic field caused by the eddy currents and this change correlates to how close the electrically conductive material is to the sensor 80. There is a coupling between the coil's magnetic field and the eddy currents similar to the coupling between the windings of a transformer that creates a mutual inductance. The coupling is distance dependent and changes in coupling affect the inductance of the coil and coupling system. The change in inductance is measured from the change in the resonant frequency of the coil. As the current reaches a steady state amplitude the inductance of the system can be calculated from the measured time constant and known resistance of the sensor electronic circuit (not shown). The sensor 80 can be modeled as a lossy inductor in parallel with a capacitor. With the inductance, capacitance and resistance of the circuit known, the resonant frequency can be calculated.

The eddy current sensor 80 outputs a value that is relatively high when the sensor 80 is relatively close to steel plate 23 or 25 and is relatively low when the sensor 80 is relatively far from the steel plate 23 or 25. The sensor 80 is relatively immune to the magnetic field of the stator coils 44 and 46 when fired. As the translator moves axially to deploy or allow the return of the struts, the translator's side steel 23 or 25 moves towards and away from the sense coil of the sensor 80. As the distance to the side steel 23 or 25 to the coil changes, the sensor 80 detects the change in coupled inductance between the coil and side steel 23 or 25. This inductive reading, in turn, is converted into a variable digital or analog signal that is reported to the vehicle controller. In this way, the clutch state is known.

Figure 6:
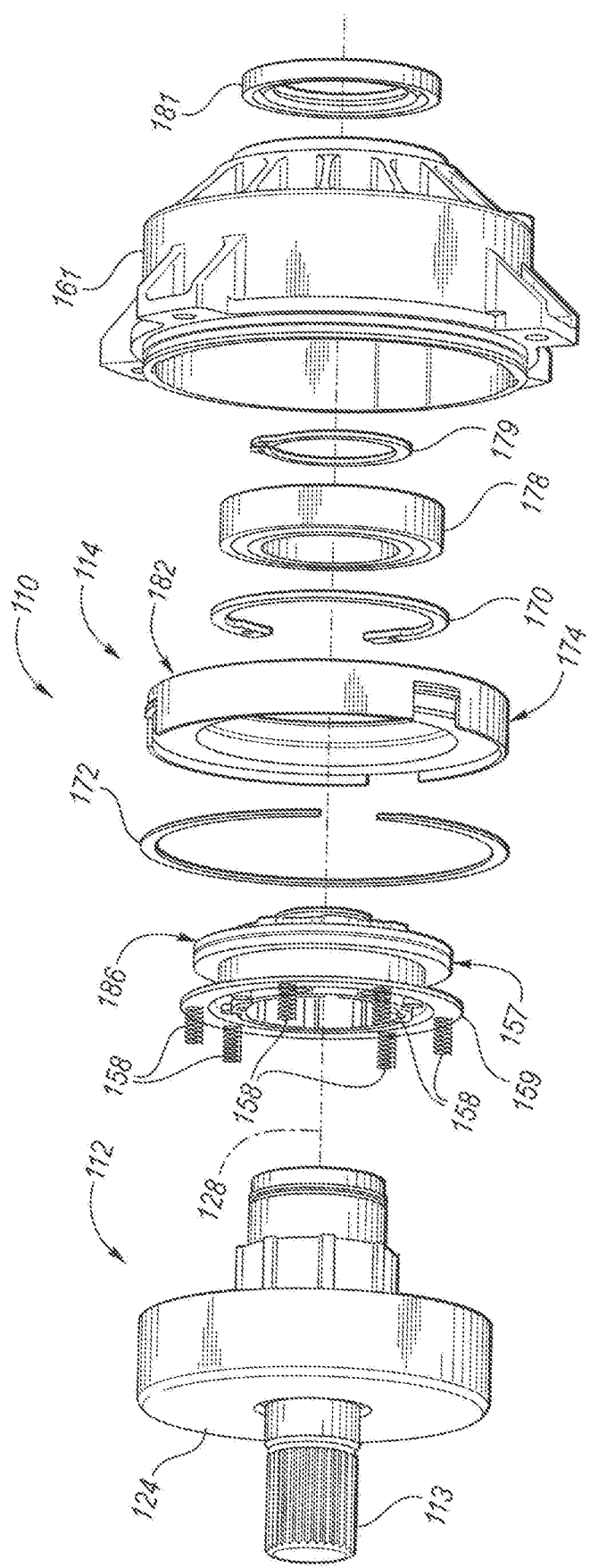
FIG. 6 is an exploded, perspective view of a electrodynamic coupling and control assembly including a DCC in accordance with at least one embodiment of the present invention.
Figure 7:
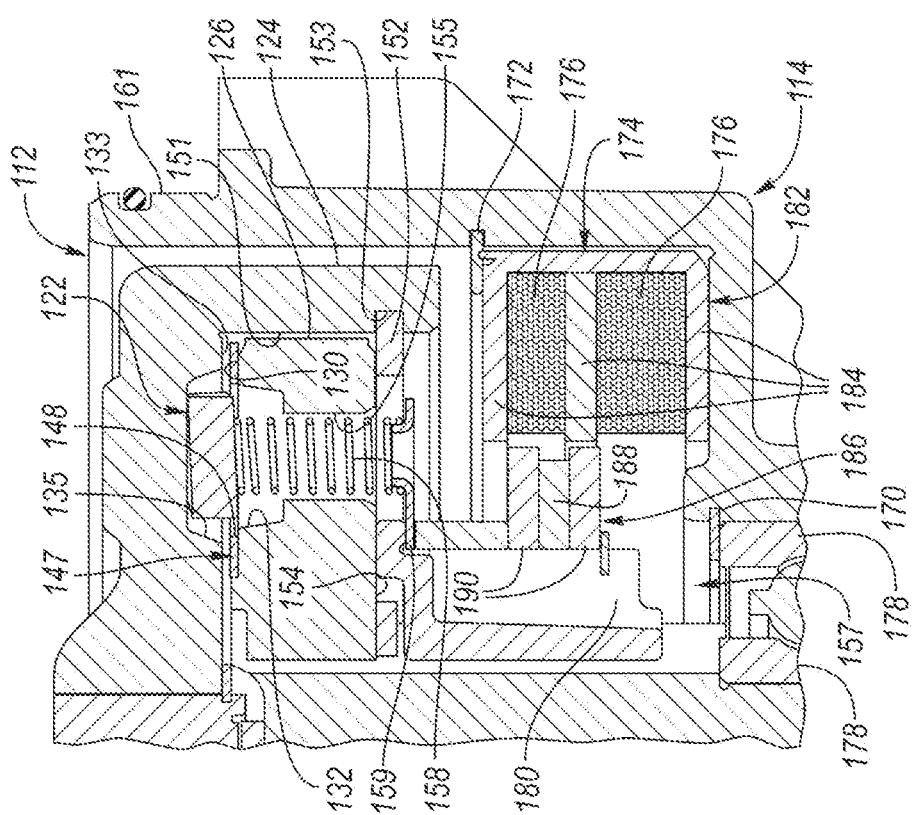
FIG. 7 is a side view, partially broken away and in cross section, of the assembly of FIG. 6 with the DCC in its free wheel mode.
Figure 8:
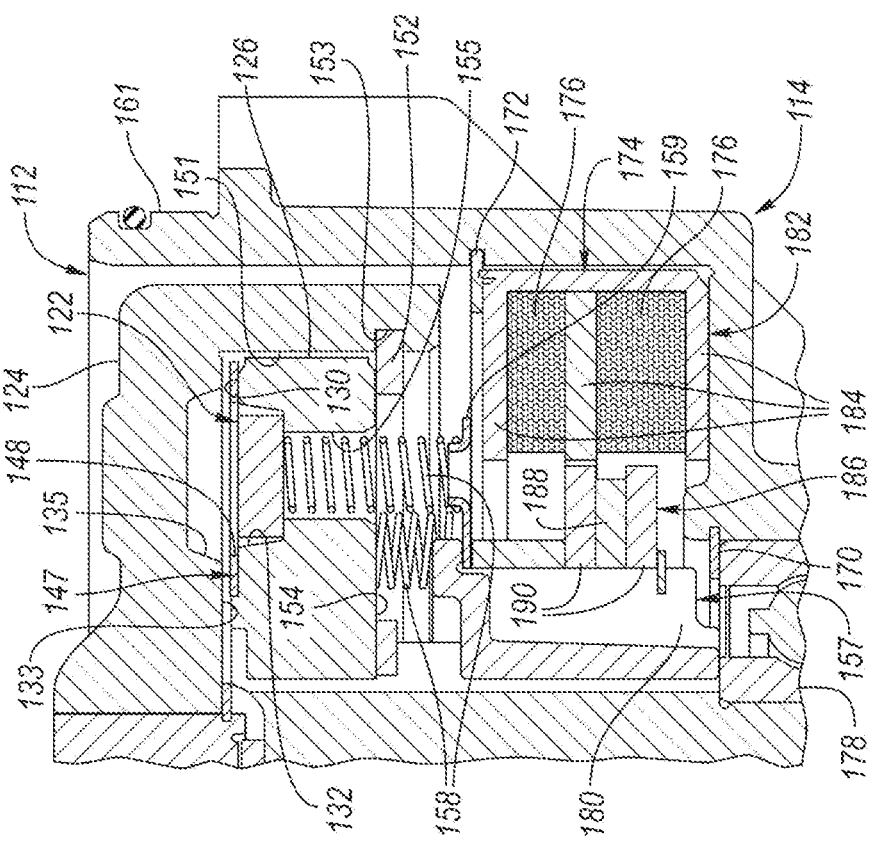
FIG. 8 is a view similar to the view of FIG. 7, but with the DCC in its lock mode.

Referring now to FIGS. 6-8, there is illustrated a coupling and control assembly, generally indicated at 110. The assembly 110 is modified as illustrated in FIGS. 9 and 10 to include non-contact, linear inductive position sensors as described hereinbelow.

The coupling subassembly 112 includes one or more seesaw-shaped, locking members or struts, generally indicated at 122. The locking members 122 controllably transmit torque between first and second clutch or coupling members 124 and 126, respectively, of the coupling subassembly 112.

The first clutch member 124 may be a notch plate and has a generally flat, annular coupling first face 133 opposed to a second face 130 of the second coupling member 126 and oriented to face axially in opposite directions along a rotational axis 128 of the assembly 110. The first face 133 has a plurality of locking formations 135 that are engaged by the locking members 122 upon projecting or pivoting from pockets 132 formed in the second coupling member 126 to prevent relative rotation of the first and second members 124 and 126 with respect to each other in at least one direction about the axis 128 of the assembly 110.

The second coupling member 126 may be a pocket plate which has inner splines 127 which can rotate in either a clockwise direction or a counter-clockwise direction about the rotational axis 128 of the assembly 110 and includes the generally flat, annular coupling face 130 having the plurality of pockets 132, each one of which is sized and shaped to receive and nominally retain the locking member 122 which may be teeter-totter strut. The pockets 132 are angularly spaced about the axis 128 of the assembly 110.

Each locking member 122 includes a member-engaging first end surface, a member-engaging second end surface, and an elongated main body portion between the end surfaces. Each locking member 122 may also include a projecting outer pivot which extends laterally from its main body portion for enabling pivotal motion of the locking member 122 about a pivot axis of the locking member 122 which intersects the pivot. The end surfaces of the locking member 122 are movable between engaged and disengaged positions between the members 124 and 126 during the pivotal motion whereby one-way torque transfer may occur between the coupling members 124 and 126 in the engaged positions of the locking members 122.

A bearing such as a roller bearing (not shown) may support each of the pivots adjacent the outer wall of each of the pockets 132. A preferred locking member or strut 122 with its bearing is shown in detail in corresponding patent application entitled "High-Speed Overrunning Coupling and Control Assembly, Coupling Assembly and Locking Member Which Pivotally Moves with Substantially Reduced Friction" filed on Jul. 22, 2019, with U.S. Ser. No. 16/518, 371 and which is incorporated in its entirety by reference herein.

The assembly 110 also includes an aperture retainer element or cover plate, generally indicated at 147, supported between the first and second clutch members 124 and 126, respectively. The retainer element 147 has a plurality of spaced openings 148 extending completely therethrough to allow the locking members or struts 122 to extend therethrough and lock the first and second clutch members 124 and 126, respectively, together. The upper surfaces of the body portions of each locking member 122 pivot against the lower surface of the retainer plate 147 during such movement.

The cover plate 147 is prevented from rotating relative to the pocket plate 124 by shoulders circumferentially spaced about the outer periphery of the cover plate 147 and which fit within corresponding apertures formed in an inner axial surface 151 of the pocket plate 124.

A snap ring 152 is disposed within a groove 153 formed in the inner annular surface 151 of the notch plate 124 to retain the notch plate 124, and the pocket plate 126 together.

The locking member 122 may be an injection molded locking member such as a metal injection molded locking member or part. In like fashion, the pocket plate 124 as well as the notch plate 126 may be injection molded.

The second coupling member 124 also has a face 154 opposite its first face 130 having a plurality of passages 155 spaced about the rotational axis 128 of the assembly 110. Each passage 155 is in communication with its pocket 132. The passages 155 communicate actuating forces to their respective locking members 122 within their respective pockets 132. The second face 130 and the opposite face 154 are generally annular and extend generally radially with respect to the rotational axis 128 of the assembly 110.

Actuators, such as spring actuators 158, are received within the passages 155 to provide the actuating forces to actuate the locking members 122 within their respective pockets 132 so that the locking members 122 move between their engaged and disengaged positions. Other types of elastically deformable plungers or actuators may be used to provide the actuating forces. The walls of the passages 155 are rigid so that the spring actuators 158 are radially supported at high rotational speeds of the pocket plate 124.

A translator structure or support member, generally indicated at 157, of the assembly 110 is operatively connected to the spring actuators 158 via an annular support plate 159 of the structure 157 to linearly move the spring actuators 158 in unison. The spring actuators 158 are supported on the plate 159 by spring supports formed on the plate 159. The support member 157 moves upon receiving a net translational magnetic force to linearly move the spring actuators 158 within their passages 155.

As described in the above-noted co-pending application U.S. Ser. No. 16/518,371, biasing members (not shown) such as return springs bias the locking members 122 against the pivotal motion of the locking members 122 towards their engaged positions. The spring actuators 158 pivot their locking members 122 against the bias of the biasing members. Each pocket 132 has an inner recess 199 (FIG. 11) for receiving its respective biasing spring wherein each pocket 132 is a spring pocket.

The assembly 110 also includes a snap ring 170 which is disposed in a groove formed in an inner axial surface of a housing 161 to hold a bearing 178 at one surface thereof. Another snap ring 179 holds the bearing 178 at an opposite surface thereof against the pocket plate 124. An annular seal 181 seals the bearing 178.

The assembly 110 includes a permanent magnet latch mechanism to hold the assembly 110 in its "on" position and its "off" position without using any energy. The magnetic latch mechanism of the assembly 110 allows for lower energy usage which means better vehicle efficiencies, less damage/wear to the components and better NVH (i.e., noise, vibration, and harshness).

A control subassembly 114 includes a stator, generally indicated at 174, having two electromagnetically inductive coils 176 to create a magnetic flux when one or both of the coils 176 is energized.

The translator structure 157 is configured for coupling with the second coupling member (i.e. the pocket plate 126) of the coupling subassembly or apparatus to rotate therewith. The translator structure 157 is supported for rotation relative to the housing 161 by the bushing or bearing 178 about the rotational axis 128 when coupled to the coupling member 126.

As previously mentioned, the translator structure 157 also includes at least one (preferably six) bi-directionally movable springs 158. Each of the springs 158 has a free end portion adapted to move within its passage 155 and engage one of the struts 122 of the coupling apparatus 112 for selective, small-displacement strut movement.

As also previously mentioned, the translator structure 157 also includes the plate 159 which is operatively connected to the rest of the translator structure 157 for selective bi-directional shifting movement along the rotational axis 128 between a first position of the translator structure 157 which corresponds to a first mode of the coupling subassembly or apparatus 112 and a second position which corresponds to a second mode of the coupling apparatus 112. When two springs 158 are provided, the springs 158 are spaced 180° apart from one another. The first and second modes may be locked and unlocked (i.e., free wheeling) modes of the coupling apparatus 112.

A first magnetic control force is applied to the spring actuators 158 when one of the coils 176 is energized to cause the spring actuators 158 to move along the rotational axis 128. By reversing the current direction in the stator 174, the spring actuators 158 move in the opposite direction along the rotation axis 128.

The translator structure 157 may include a hub or carriage 180 adapted for coupling with the pocket plate 126 of the coupling apparatus 112. The pocket plate 126 is supported for rotation relative to the housing 161 by the bushing 178 about the rotational axis 128. The hub 180 also slidably supports the plate 159 during its shifting movement along the rotational axis 128.

The translator structure 157 also, preferably, includes a set of spaced guide pins (not shown) sandwiched between inner surfaces of the hub 180 and an outer surface of the pocket plate 126 which pins extend along the rotational axis 128. The inner surface and the outer surface may have V-shaped grooves or notches formed therein to hold the guide pins. The hub 180 slide on the guide pins during shifting movement of the plate 159 and the spring actuators 158 along the rotational axis 128.

The stator 174 also includes a ferromagnetic housing, generally indicated at 182, having spaced apart fingers 184, and the electromagnetically inductive coils 176 housed between adjacent fingers 184.

The translator structure 157 also includes an annular outer subassembly 186 connected to the hub 180. The subassembly 186 includes magnetic annular ring segments 188 sandwiched between a pair of ferromagnetic backing rings 190. The magnetic control forces magnetically bias the fingers 184 and their corresponding backing rings 190 into alignment upon coil energization. Magnetic forces latch the spring actuators 158 in their "on" and "off" positions. The rings 188 and 190 are acted upon by the stator 174 to move the spring actuators 158.

Similar to the embodiment of FIGS. 4 and 5, the embodiment of FIG. 9 (which is based on the assembly of FIGS.

6-8) also includes a linear, inductive position sensor, generally indicated at 200, having a PCB 202 and an active coil area 204 to sense or detect the translator linear positions which correspond to the "fully connected" and the "fully disconnected" states of the clutch. The sensor 200 is mounted to the housing of the assembly via a connector header 206, a bracket 208 and a bolt 210. A snap ring 212 is also added.

The sensor 200 provides digital variable position data to the vehicle controller to thereby allow the controller to determine "fully converted" and "fully disconnected" clutch states. Translator position detection can occur while the stator coils are firing.

Similar to the embodiments of FIGS. 4, 5 and 9, the embodiment of FIG. 10 also includes a linear, inductive position sensor, generally indicated at 220, having a PCB 222, a connector 224 and an active coil area on or within the PCB 222 to sense or detect the translator linear positions which correspond to the "fully connected" and "fully disconnected" states of the assembly. The sensor 220 is mounted to housing of the assembly via additional housing material 226 and an O-ring 228. The plastic hub is modified to have an extended length at 230 and includes an embedded aluminum target ring 232. The sensor 220 uses geometry variations in the receiver coil to vary the mutual inductance coupling as the target moves relative to the coil. An air gap 231 between the linear inductive sensor's coil and the target remains constant throughout the translator stroke, while the air gap varies in the previous axial sensor embodiment. The varying air gap in the axial version induces the varying mutual inductance coupling which the sensor then equates to displacement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling and control assembly, comprising:
a control assembly housing;
a stator structure including a stator housing carried in the control assembly housing, defining a rotational axis, and also including at least one electromagnetic source disposed within the stator housing;
first and second coupling members each of which is supported for rotation about the rotational axis and a locking member for selectively mechanically coupling the coupling members together, wherein the first coupling member is a notch plate, the second coupling member is a pocket plate, and the locking member is a strut or a rocker;
a translator structure coupled to the second coupling member to rotate therewith, the translator structure including a plunger having a free end portion configured to move within a passage in the second coupling member to engage and actuate the locking member disposed within the second coupling member, the translator structure being supported for translational movement relative to the stator housing along the rotational axis between first and second stable axial end positions which correspond to first and second operating states of the assembly, respectively, the translator structure translating along the rotational axis between the different end positions upon experiencing a net translational force, the net translational force comprising a first translational force caused by energization of the at least one electromagnetic source and a magnetic latching force based upon linear position of the translator structure along the rotational axis relative to the stator housing; and
a non-contact, linear inductive position sensor mounted to the control assembly housing on a side of the stator structure axially opposite that of the second coupling member and including an active coil, wherein the translator structure includes a coupler element made of an electrically conductive material, wherein a gap between the active coil and the coupler element remains constant throughout axial movement of the translator, and wherein the sensor is configured to create a magnetic field to induce eddy currents in the electrically conductive material of the coupler element wherein movement of the coupler element changes the magnetic field caused by the eddy currents, the sensor providing a position feedback signal for vehicle transmission control wherein the signal is correlated with the linear position of the translator structure along the rotational axis, and wherein the linear inductive position sensor is elongated axially with respect to the rotational axis.

2. The coupling and control assembly as claimed in claim 1, wherein the at least one electromagnetic source includes at least one electromagnetically inductive coil.

3. The coupling and control assembly as claimed in claim 1, wherein one of the structures includes a permanent magnet source.

4. The coupling and control assembly as claimed in claim 1, wherein the translator structure has a pair of stable, unpowered, magnetically latching states which correspond to coupling and uncoupling positions of the locking member.

5. The coupling and control assembly as claimed in claim 1, wherein the sensor includes a printed circuit board and wherein the coupler element is supported proximate the board.

6. The coupling and control assembly as claimed in claim 1, wherein the coupler element comprises an annular conductive ring.

7. The coupling and control assembly as claimed in claim 1, wherein the sensor is mounted on an interior surface of the control assembly housing.

8. The assembly of claim 1, wherein the linear inductive position sensor is embedded in the control assembly housing.

9. A coupling and control assembly rotatable about a rotational axis, and comprising:
a coupling assembly, including
a first coupling member including a first coupling face having a first plurality of locking formations, wherein the first coupling member is a notch plate,
a second coupling member rotatable about the rotational axis and axially retained with respect to the first coupling member and including a second coupling face opposed to the first coupling face of the first coupling member and having a second plurality of pockets corresponding to the first plurality of locking formations of the first coupling member and also having a plurality of passages extending through the second coupling member in communication with the second plurality of pockets, wherein the second coupling member is a pocket plate, a cover plate between the first and second coupling members and having a plurality of spaced openings, and
a plurality of locking members extendable through the spaced openings of the cover plate to transmit torque between the first and second coupling members, wherein the plurality of locking members include a plurality of struts or a plurality of rockers; and a control assembly, including
a control assembly housing,
a stator including a stator housing carried in the control assembly housing and having spaced apart fingers,
an electromagnetic source carried in the stator housing and including electromagnetic coils housed between the spaced apart fingers of the stator housing,
a bearing,
a translator translatable along the rotational axis, rotatable about the rotational axis relative to the control assembly housing via the bearing, and coupled to the second coupling member to be rotatable therewith, and including
a hub carrying a sensor target,
a plate supported by the hub, and
a plurality of actuators supported on the plate and extending into the plurality of passages of the second coupling member to engage and actuate the plurality of locking members, and
a linear inductive position sensor mounted to the control assembly housing on a side of the stator axially opposite that of the second coupling member and having an active coil to sense linear positions of the translator via the sensor target carried by the hub of the translator, wherein a gap between the active coil and the sensor target remains constant throughout axial movement of the translator, and wherein the linear inductive position sensor is elongated axially with respect to the rotational axis.

10. The assembly of claim 9, wherein the translator further includes an annular outer subassembly connected to the hub and including magnetic annular ring segments sandwiched between ferromagnetic backing rings.

11. The assembly of claim 9, wherein the linear inductive position sensor is embedded in the control assembly housing.

12. A coupling and control assembly rotatable about a rotational axis, and comprising:
a coupling assembly, including
a notch plate,
a pocket plate rotatable about the rotational axis and axially retained with respect to the notch plate,
a cover plate between the notch and pocket plates and having a plurality of spaced openings, and
a plurality of locking members extendable through the spaced openings of the cover plate to transmit torque between the notch and pocket plates, wherein the plurality of locking members include a plurality of struts or a plurality of rockers; and
a control assembly, including
a control assembly housing,
a stator including a stator housing carried in the control assembly housing and having spaced apart fingers,
an electromagnetic source carried in the stator housing and including electromagnetic coils housed between the spaced apart fingers of the stator housing,
a bearing,
a translator translatable along the rotational axis, rotatable about the rotational axis relative to the control assembly housing via the bearing, and coupled to the second coupling member to be rotatable therewith, and including
a hub carrying a sensor target,
a plate supported by the hub, and
a plurality of actuators supported on the plate and extending into a plurality of passages of the pocket plate to engage and actuate the plurality of locking members, and
a linear inductive position sensor embedded in the control assembly housing on a side of the stator axially opposite that of the pocket plate and having an active coil to sense linear positions of the translator via the sensor target carried by the hub of the translator, wherein a gap between the active coil and the sensor target remains constant throughout axial movement of the translator, and wherein the linear inductive position sensor is elongated axially with respect to the rotational axis.

* * * * *